(12) United States Patent
Tanaka et al.

(10) Patent No.: US 6,408,578 B1
(45) Date of Patent: Jun. 25, 2002

(54) METHOD OF FINISHING EDGE OF SHEET GLASS, HEAT-TEMPERED SHEET GLASS USING THE METHOD, AND FIRE-RESISTANT CONSTRUCTION MATERIAL USING THE HEAT-TEMPERED SHEET GLASS

(75) Inventors: Keisuke Tanaka; Kiminari Sugiura; Shigeki Obana, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/447,486

(22) Filed: Nov. 23, 1999

Related U.S. Application Data

(62) Division of application No. 09/067,726, filed on Apr. 28, 1998, now Pat. No. 6,004,655, which is a continuation of application No. 08/547,813, filed on Oct. 25, 1995, now abandoned.

(30) Foreign Application Priority Data

Oct. 26, 1994 (JP) .............................................. 6-260859
Sep. 8, 1995 (JP) .............................................. 7-231055

(51) Int. Cl.[7] ................................................ E06B 3/66
(52) U.S. Cl. ............................... 52/204.62; 52/204.64; 52/204.69; 52/204.7; 52/204.591; 52/764; 52/769; 52/773
(58) Field of Search ..................... 52/232, 202, 204.62, 52/204.63–204.65, 204.67–204.69, 204.7, 204.55, 204.591, 573.1, 308, 764, 766, 769, 770, 773, 800.1, 800.11

(56) References Cited

U.S. PATENT DOCUMENTS 3,256,668 A * 6/1966 Downes ....................... 52/769
4,165,228 A    8/1979 Ebata et al.
4,703,598 A * 11/1987 Wilson et al. ............. 52/238.1
4,911,743 A    3/1990 Bagby
5,735,089 A * 4/1998 Smith et al. .................. 52/202

FOREIGN PATENT DOCUMENTS

| JP | 53147492 | 4/1952 |
| JP | 56170418 | 5/1955 |
| JP | 508192 | 1/1975 |
| JP | 50102996 | 8/1975 |
| JP | 5131993 | 3/1976 |
| JP | 52136493 | 11/1977 |
| JP | 53145829 | 12/1978 |
| JP | 57184662 | 11/1982 |
| JP | 62176746 | 8/1987 |
| JP | 64500512 | 2/1989 |
| JP | 4360772 | 12/1992 |
| JP | 7237941 | * 9/1995 ............. E06B/3/66 |

* cited by examiner

Primary Examiner—Carl D. Friedman
Assistant Examiner—Jennifer I. Thissell
(74) Attorney, Agent, or Firm—Fulbright & Jaworski L.L.P.

(57) ABSTRACT

A method of finishing an edge of a sheet glass is disclosed. The method includes a first grinding step for grinding an edge of a sheet glass so as to provide the edge with an outwardly convex curved shape, and a finishing step for finishing a bordering portion which has been formed by the first grinding step between the curved edge and each flat side face of the sheet glass, so as to provide this bordering portion with a greater smoothness than smoothness provided by the first grinding step. A heat-tempered sheet glass using the method and a fire-resistant construction material using this heat-tempered sheet glass are also disclosed.

3 Claims, 3 Drawing Sheets

(a)

(b)

METHOD OF FINISHING EDGE OF SHEET GLASS, HEAT-TEMPERED SHEET GLASS USING THE METHOD, AND FIRE-RESISTANT CONSTRUCTION MATERIAL USING THE HEAT-TEMPERED SHEET GLASS

This application is a division of U.S. Ser. No. 09/067,726 filed Apr. 28, 1998 (now U.S. Pat. No. 6,004,655), which is a continuation of U.S. Ser. No. 08/547,813 filed Oct. 25, 1995 (now abandoned).

BACKGROUND OF THE INVENTION

1. Field of the Invention

The present invention relates to a method of finishing an edge of a sheet glass for use in e.g. fire-resistant construction material such as a fire-resistant door, a fire-resistant window or the like, a heat-tempered sheet glass using the method, and relates also to a fire-resistant construction material using this heat-tempered sheet glass.

2. Description of the Related Art

When a sheet glass is used in a fire-resistant construction material such as a fire-resistant door, it is necessary for the glass to have a high edge strength in order to avoid a heat cracking phenomenon of this sheet glass. Namely, when sheet glass is subjected to a significant heat, heat expansion occurring at the center area of the sheet glass applies a tension to the edge of the sheet glass fixedly supported to a window sash, for example. Then, when this tension exceeds the edge strength of the sheet glass, a cracking occurs in the sheet glass. This is the heat cracking phenomenon.

As fire-resistant sheet glass, there are known a wired sheet glass and a laminated glass incorporating an intermediate layer made of silica hydrate alkaline. In the case of the former, its transparency may be a problem since the embedded wire hinders the the view. The latter also has the possibility of losing its transparency due to bubbling of the intermediate layer resulting from a thermal variation. As an alternative free from such drawbacks, there is known a sheet glass prepared to heat-tempering treatment of soda-lime glass material.

As such heat tempering treatment, the convention has provided a method comprising the steps of: heating a sheet glass at a temperature range (approximately, 760 deg. C.) significantly higher than a melting point of the glass (720 to 730 deg. C.); and then spraying a cooling air against the sheet glass at an extremely high pressure such as a back pressure of 950 mmAq, for instance. With such heat tempering treatment of the sheet glass as above, it is possible in deed to provide the sheet glass with a predetermined edge strength. However, since the air is sprayed at the very high pressure against the sheet glass which has been heated up to such high temperature range as exceeding the melting point of the glass, this spraying may result in surface irregularity or warping of the sheet glass which leads to distortion of the image reflected by the sheet glass.

According to a conventional method of finishing an edge of such sheet glass as described supra, in order to obtain a flat and even edge, as illustrated in FIGS. 6(a) and (b), a cup abrading wheel 20 is rotated about an axis while causing a side face 20a of the wheel to contact an edge 21a or a ridge 21b of the sheet glass 21. The cup abrading wheel includes diamond or abrading stone or the like affixed on the side face 20a thereof.

With such sheet glass edge abrading method as described supra, a very fine abrade streak, which is hardly recognizable with naked eyes, is formed at the ridge portion as a result from the abrading of the edge portion. For this reason, a thermal stress associated with a thermal expansion tends to be concentrated at the abrade streak. In particular, in the case of the soda-lime glass (without heat-tempering treatment), it is not possible to provide this glass with a high edge strength.

Accordingly, in order to allow its use as a fire-resistant sheet glass, the above-described heat tempering treatment is needed. But, this treatment involves the inconveniences described supra. Further, if the heat tempering treatment is effected at a lower heating temperature and/or lower back pressure of the spraying air than the conventional method in order to avoid the inconveniences, (surface irregularity, warping) of the heat tempering treatment, then, this will result in an insufficient edge strength of the sheet glass obtained as a fire-resistant door.

In view of the above-described state of the art, the primary object of the invention is to solve the drawbacks of the conventional art by providing an improved method of finishing an edge of a sheet glass capable of increasing the edge strength of the glass, a heat-tempered glass with a predetermined edge strength made by using the method, and also a fire-resistant construction material using this heat-tempered sheet glass.

SUMMARY OF THE INVENTION

For fulfilling the above-noted objects, a method of finishing an edge of a sheet glass, according to the present invention, comprises:

a first abrading step for abrading an edge of a sheet glass so as to provide the edge with an outwardly convex curved shape; and a finishing step for finishing a bordering portion which has been formed by the first abrading step between the curved edge and each flat side face of the sheet glass, so as to provide this bordering portion with a greater smoothness than smoothness provided by the first abrading step.

In general, the stress occurring within a sheet glass is apt to be concentrated at the ridge portions of the sheet glass. Then, according to the sheet glass edge finishing method of the present invention, the method comprises the first abrading step for abrading an edge of a sheet glass so as to provide the edge with an outwardly convex curved shape; and a finishing step for finishing a bordering portion which has been formed by the first abrading step between the curved edge and each flat side face of the sheet glass, so as to provide this bordering portion with a greater smoothness than smoothness provided by the first abrading step. Hence, it is possible to restrict connection of stress at the edge portion of the sheet glass. Especially, by effecting the finishing step for finishing a bordering portion which has been formed by the first abrading step between the curved edge and each flat side face of the sheet glass, so as to provide this bordering portion with a greater smoothness that smoothness provided by the first abrading step, the ridge portions are substantially eliminated to provide a smoother finished surface. Accordingly, it is possible to avoid the formation of the abrade streak which tends to invite the concentration of the stress at this portion. As a result, the method of the invention allows the sheet glass to obtain a higher edge strength than the convention.

With the increased edge strength, even if the heat tempering operation is effected at a lower temperature range and/or lower air-spraying pressure than the convention, the resulting sheet glass may retain a predetermined sufficient edge strength after the heat-tempering treatment. As a result, it becomes possible to avoid the inconveniences of the prior art such as the surface irregularity or warping which leads to a reflection image distortion. Moreover, the running costs of the heat-tempering system may be reduced as well.

In summary, according to the invention's method of finishing the edge of a sheet glass, it becomes possible to restrict concentration of thermal stress at the edge of the sheet glass and hence to increase the edge strength of the sheet glass. As the result, even if the heat-tempering treatment of the sheet glass is effected by a simpler method than the conventional method, the resulting glass may maintain sufficient performance as a fire-resistant sheet glass. Accordingly, the method achieves improvement of the quality of the sheet glass and also reduction of the running cost of the heat-tempering treatment system.

The finishing step maybe carried out by a variety of manners such as buffing, heat melting, chemical melting or the like.

If the finishing step is carried out by buffing, it is possible to polish the surface with the irregularity in the order of a few $\mu$m's.

Further, if the finishing step is carried out by heat melting, it is possible to provide the finished surface with the same finish as the sheet glass per se, so that the stress applied to the sheet glass may be born by the entire edge thereof. As a result, the edge strength of the sheet glass may be further increased.

If the finishing step is carried out by chemical melting, this finishing step per se may be carried out by a simple process, so that the efficiency of the edge finishing operation of the sheet glass may be improved.

For accomplishing the above-noted object, in a heat-tempered sheet glass, according to the present invention, the sheet glass has its entire surface subjected to a heat-tempering treatment, the sheet glass comprises an edge thereof formed as an outwardly convex curved edge having an intermediate portion in the thickness direction thereof projecting outwards in the direction of the plane of the sheet glass.

wherein, the curved edge has a maximum surface irregularity ranging below 0.05 mm; and a bordering portion formed between the curved edge and each flat side face of the sheet glass has a maximum surface irregularly ranging below 0.007 mm.

With the above construction, the edge of the sheet glass having its entire face thereof subjected is a heat-tempering treatment is formed as an outwardly convex curved edge portion having an intermediate portion in the direction of thickness thereof projecting outwards in the direction of the plane of the sheet glass, and this curved edge portion has a maximum surface irregularity ranging below 0.05 mm. Further, a bordering portion formed between the curved edge portion and a flat portion on each side face of the sheet glass has a maximum surface irregularity ranging below 0.007 mm. Accordingly, this heat-tempered glass may effectively restrict concentration of stress at the edge portion.

More particularly, the curved edge portion formed at the edge of the sheet glass is provided with very smooth finish of maximum surface irregularity ranging lower than 0.05 mm. Moreover, no ridges are formed at this curved edge portion. Hence, concentration of stress at the curved edge portion may be avoided. Further, the bordering portion formed between the curved edge portion and a flat portion on each side face of the sheet glass is provided with even smoother finish having a maximum surface irregularity ranging below 0.007 mm. Therefore, the entire sheet glass too may be free from ridges which tend to invite concentration of stress. As a result, it becomes possible to avoid the stress concentration at the edges of the sheet glass, wherein the edge strength of this sheet glass and be increased to be higher than 4 kgf/mm$^2$ approximately.

Incidentally, in the case also of a curved shape which is structurally advantageous for avoiding stress concentration, if its surface irregularity ranges over 0.05 mm, the stress concentration still tends to occur at the ridges and bottoms of this uneven surface. Further, in the case of the bordering portion between the curved edge portion and each flat side face of the sheet glass, as this portion comprises a 'inter-face transition region', the stress concentration tends to occur at the ridges and bottoms of its irregularity if the irregularity is greater, at its maximum, than 0.007 mm.

With the increased edge strength described above, even if the heat-tempering operation is effected by a heating operation at a temperature range lower than that of the convention or by an air spraying operation at an air pressure lower than that of the convention, the resultant glass may still be free from such inconvenience of the conventional art as the surface irregularity or warping which distorts the reflection image while maintaining a predetermined sufficient edge strength.

Therefore, with the heat-temperature glass according to the present invention, even if the heat tempering operation of the sheet glass is effected by a simpler method than these employed in the convention, the resultant sheet glass may still maintain good performance as a heat-resistant glass. So that, it is possible to improve the quality of the sheet glass and also to reduce the running costs of the system used for the heat tempering operation.

Further, as described in the appended claim 5, preferably, the surface compressing stress used in the heat tempering treatment ranges over 17 kgf/mm$^2$.

Incidentally, if a sheet glass is to be used as a Class A or Class B fire-resistant door according to a fire-resistant testing based on the Japanese Construction Ministry Public Notice No. 1125, there is the possibility of danger of heat cracking in the sheet glass unless the sheet glass has an edge strength higher than 21 kgf/mm$^2$ (in case the sheet glass is supported by a retainer metal element 9 having good heat conduction characteristics, with an engaging depth d of a peripheral edge of the sheet glass with a sash being 10 mm approximately, as illustrated in FIG. 2). In this respect, with the construction set forth in claim 5 of the present invention, the surface compressing stress used in the heat tempering treatment is provided to be higher than 17 kgf/mm$^2$. Then, in combination with the edge strength higher than 4 kgf/mm$^2$ obtained by the edge finishing process described supra, the sheet glass may obtain an edge strength which is in effect higher than 21 kgf/mm$^2$. Accordingly, this sheet glass may be used as the Class A or B fire-resistant door without any problems.

Incidentally, if the sheet glass is supported with a greater engaging depth of about 15 mm, there occurs a slightly greater temperature difference between the peripheral edge and the center portion of the sheet glass. Therefore, a greater surface compressing force greater than 18 kgf/mm$^2$ will be needed in this case.

Further, if the sheet glass is supported with the greater engaging depth of about 15 mm and without the use of the retainer metal element 9 (see FIG. 5), the surface compressing stress needs to be still higher than 22 kgf/mm$^2$.

As described above, in any of the various support conditions, the sheet glass may be used as the Class A or B fire-resistant door.

A fire-resistant construction material according to the present invention is characterized in that the material uses the heat-tempered sheet glass described above. Then, this fire-resistant construction material may be used as a fire-resistant door or fire-resistant window having superior fire resistance.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of the present invention will be described in details with reference to the accompanying drawings.

Figure 2:
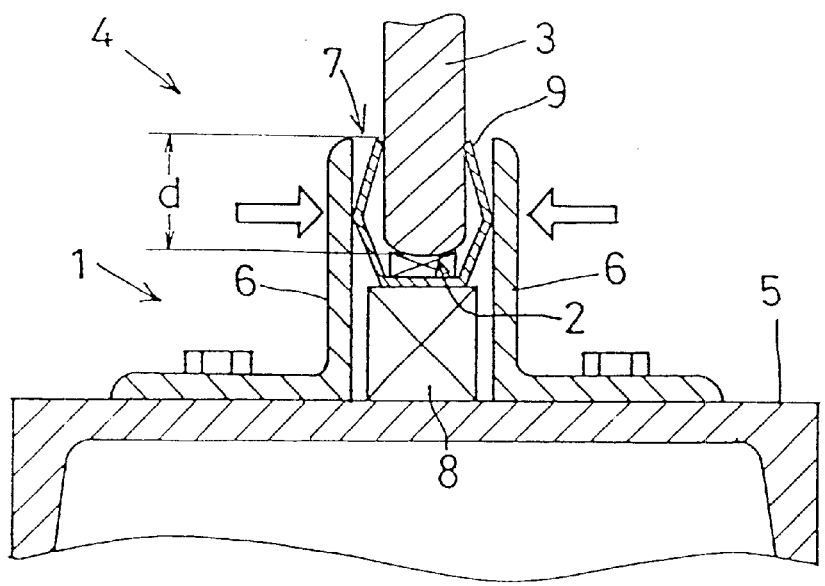
FIG. 2 is a section view showing principal portions of a fire-resistant door according to the embodiment of FIG. 1.

FIG. 2 shows a fire-resistant door comprising a sheet glass 3 having an edge 2 thereof finished to a sheet glass edge finishing method of the invention, and a sash 1 in which the sheet glass 3 is fitted.

The sash 1 includes an annular sash body 5 forming a door frame, and a pair of holder members 6 for holding, therebetween, the sheet glass 3 fixed in position to the sash body 5.

The sash body 5 and the holder members 6 are both formed of metal, so as to be able to retain the sheet glass 3 in the case of a fire. The holder members 6 specifically comprise a pair of angle members which are mounted on the sash body 5 so as to form therebetween a space 7 capable of holding an edge 2 of the sheet glass 3 therein.

The space 7 accommodates therein a setting block 8 formed of chloroprene rubber having a protecting function for the edge of the sheet glass 3 and a retainer metal element 9 for binding the edge 2 of the sheet glass 3 for securing the edge 2 to the holder members 6. The setting block 8 is disposed within the space 7 at the bottom side of the sash 1.

The retainer element 9 is formed of a thin metal plate element and constructed so that the element 9 ay elastically retain and secure the edge 2 of the sheet glass 3 as accommodated within the space 7. More particularly, this retainer element 9 has a length corresponding substantially to a length of the edge 2 of the sheet glass 3. Further, as shown in FIG. 2, this retainer element 9 has an angular U-like cross sectional shape (like a hexagon without its top side) as viewed in the longitudinal direction of the edge 2. Then, the opposed lateral sides of the U-shape are brought into line-contact with the front and back faces of the sheet glass 3, respectively. Further, the retainer element 9 has an outer diameter greater than the width of the space 7, so that, when the element 9 is set within the space 7 with the edge 2 of the sheet glass 3 being held therein, the element 9 may firmly retain and fix the sheet glass 3 as receiving compressing forces in the binding direction from the holder members 6. As a result, it is possible to avoid an inadvertent disengagement of the peripheral edge of the sheet glass due to thermal deformation thereof in the event of a fire.

Incidentally, as the retainer element 9 is formed of metal material (e.g. iron and steel, stainless steel or the like), this element has a good heat conduction characteristics, so that the element may quickly adjust to the ambience temperature. Thus, if a firm occurs, the element 9 may readily conduct the heat to the peripheral edge of the sheet glass 3 retained by this element 9, so that a sharp temperature difference is hardly developed between the peripheral edge and the center portion of the sheet glass, and consequently there hardly occurs breakage of the sheet glass. If converting this breakage resistance into the stress applied to the edge, then, in the standard support condition shown in FIG. 2 where the engaging depth d of the sheet glass 3 relative to the holder members 6 is about 15 mm, there is applied a stress of 22 $kgf/mm^2$ approximately. In the case of a shorter engaging depth of 10 mm approximately, there occurs a correspondingly smaller temperature difference between the center portion and the peripheral edge of the sheet glass. Then, the applied stress is reduced by about 1 $kgf/mm^2$ to be 21 $kgf/mm^2$ approximately.

Next, the sheet glass 3 will be particularly described.

This sheet glass 3 is formed by subjecting a sheet glass made of soda-lime manufactured by a method not using any metal hangers and then subjecting this sheet glass to a heat tempering treatment.

For finishing an edge of the above sheet glass 3, a first abrading step is effected for abrading an end face of the sheet glass into a curved shape having an intermediate portion in the direction of thickness of the sheet glass 3 outwardly projecting in the direction of plane of the sheet glass 3 (the abraded face has a maximum irregularity ranging lower than 0.05 mm); and then a finishing step is effected for finishing a bordering portion formed between the curved edge 3a formed at the end face of the sheet glass 3 by the first abrading step and a flat portion 3b on the front and back face respectively of the sheet glass 3, so as to provide this bordering portion with a greater smoothness (the finished face obtains a maximum irregularity less than 0.007 mm) than the smoothness provided by the first abrading step.

Figure 1:
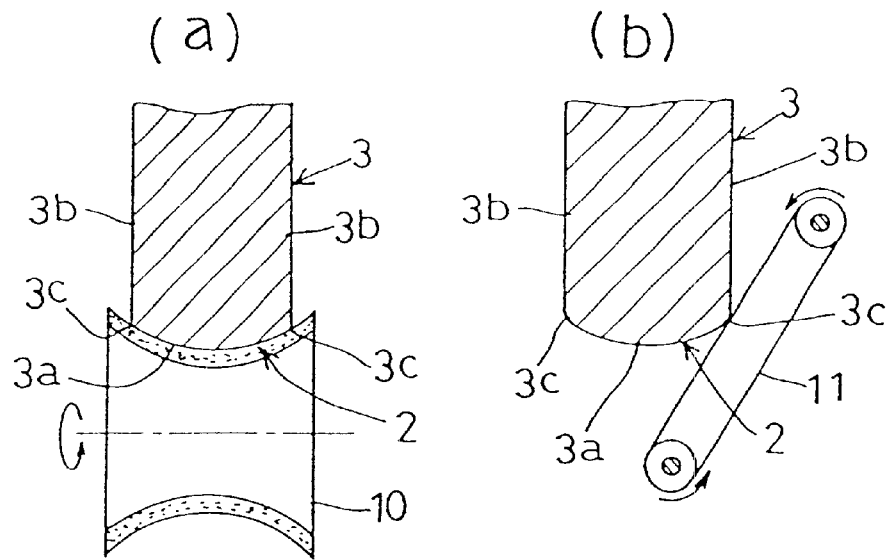
FIGS. 1(a) and (b) are descriptive views illustrating a method of finishing an edge of a sheet glass according to the present invention.

More particularly, as illustrated in FIG. 1(a), the first abrading step is effected by a plain rotation cylindrical wheel abrading method utilizing an outer peripheral face of a cylindrical wheel 10 rotated about an axis. This cylindrical wheel 10 has a gradually reduced outer diameter toward the center thereof in the axial direction, so as to abrade the edge face of the sheet glass as a face to be abraded into an outwardly projecting curved shape. The outer peripheral face of the cylindrical wheel 10 comprises a abrading portion which is finer than #200.

The curved edge 3a formed by the first abrading step has a maximum surface irregularity of 0.03 mm approximately. Because of such extremely small irregularity, this finished face may effectively avoid concentration of stress in the sheet glass 3.

Further, the abrading direction of the first abrading step is set along the longitudinal direction of the edge face of the sheet glass, so that the abrade streak formed in associated with the abrading is formed along the longitudinal direction of the sheet glass edge face. This also serves to avoid the concentration of thermal breaking force acting along the sheet face of the sheet glass 3.

As illustrated in FIG. 1(b), the finishing step is effected by a buffing method using an abrading belt 11 entrained and rotated about two rotational axes. This buffing operation is referred to also as a superfine finish, and this finish is effected generally be using the belt 11 made of sheep skin. The buffing is effected while pouring a water solution of cerium oxide on to the portion to be polished, so that the polished face obtains a surface roughness of 3 to 7 $\mu$m (almost equal to the surface roughness of the front and back faces of the sheet glass) and obtains luster as well. As a result, this significantly reduces the possibility of stress concentration at the bordering portion 3c. In embodying the present invention, however, any other abrasive than cerium oxide described supra may be used as long as the agent may provide the surface with such ultra-fine roughness.

As described above, by effecting the first abrading step and subsequently the finishing step, it is possible to significantly restrict the occurrence of stress concentration of the edge portion 2 of the sheet glass 3. In particular, it becomes possible to avoid the occurrence of stress concentration along the sheet face of the sheet glass 3. As a result, the resultant sheet glass will hardly break even when subjected to heat in the event of a fire. And, it has been confirmed that this sheet glass may be provided with an edge strength exceeding 4 $kgf/mm^2$ approximately.

As described hereinbefore, it order to allow a sheet glass to be used as the Class A or B fire-resistant door specified in a fire resistance testing based on the Japan Construction Ministry Public Notice No. 1125, the sheet glass needs to have an edge strength not lower than 26 $kgf/mm^2$ (in case the engaging depth is about 15 mm). Then, with the sheet glass 3 according to this embodiment, the retaining by the retainer element 9 serves to damp 4 $kgf/mm^2$ of stress and the above-described finishing treatment of the edge face provides the edge with the strength of about 4 $kgf/mm^2$ or more. Hence, in total, the required addition of the edge strength by the heat tempering operation may be only in the remaining amount of 18 kgf/mm or more. Further, in the case of the shallow engagement support condition of the engaging depth at 10 mm approximately, the temperature difference between the center portion and the peripheral edge of the sheet glass too slightly decreases correspondingly. Thus, in this case, the heat temperature treatment need to add the edge strength by only 17 $kgf/mm^2$ or more.

Accordingly, in the heat tempering operation of the sheet glass 3 of the present invention, unlike the convention, the heating temperature of the sheet glass 3 does not need to be as high as 760 deg. C. and the back pressure of the nozzle, in the case of cooling air spraying operation, does not need to the as high as 950 mm Aq. Instead, a predetermined sufficient edge strength may be obtained even if the heating temperature is lower than the melting point of the glass (720–730 deg. C.) or the back pressure of cooling air spraying is as low as 500 mm Aq. As a result, it has become possible to avoid quality deterioration (irregularity or warping of the glass surface) of the sheet glass resulting from the severe heat tempering treatment, thereby to improve the yield of the product and also to reduce the running costs of the system used for the heat tempering treatment.

Incidentally, the edge strength (the surface compression stress as its alternative characteristics) of the heat-tempered sheet glass 3 was measured by the total internal reflection stress measuring method. In this total internal reflection stress measuring method, on a sheet glass surface to be measured, a prism having a refraction index slightly greater than the sheet glass was placed; and a circularly polarized light beam convergent at a target point of measurement was caused to be incident on the surface at an angle substantially equal to the critical angel of total internal reflection. Then, a displacement amount between alternating occulting total internal reflection border-lines appearing in a view of a reflection light observing telescope was determined by a scale calibrated by known stress values.

Next, other embodiments will be described.

[1] The first abrading step is not limited to the abrading step using the strength cup grinding wheel described in the foregoing embodiment. Instead, in this first abrading step, e.g. a different grinding step using a cup wheel (a abrading wheel having a abrading diamond or grinding stone affixed to the wheel surface), or a buffing or all these methods may be used in combination.

The finishing step is not limited to the buffing described in the foregoing embodiment. Instead, the finishing step may be effected by local heat fusing of the edge of the sheet glass 3 or by means of chemical fusion. In short, any method may be employed as long as the method employed may provide the bordering portion 3 between the curved face portion 3a and the flat portion 3b of the front or back face of the sheet glass 3 with a smoother finish than that provided by the first abrading step. And, preferably, the curved edge 3a should be provided with a maximum surface irregularity smaller than 0.05 mm and the bordering portion 3c should be provided with a maximum surface irregularity smaller than 0.007 mm, respectively.

Figure 3:
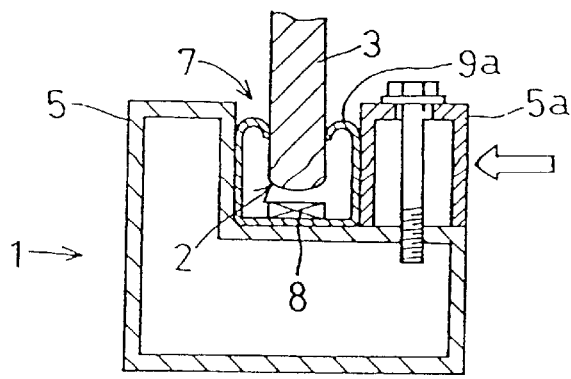
FIG. 3 is a section view showing an attaching condition of a sheet glass relating to a further embodiment.

[2] The attachment construction between the sheet glass 3 according to the foregoing embodiment and the sash body 5 is not limited to the construction described in the foregoing embodiment. For instance, as shown in FIG. 3, if the sheet glass 3 is mounted and secured by using an elastic metal retainer member 9a which comes into face-contact with the sash body 5, the radiation heat to the sash body 5 may be efficiently conducted from the retainer element 9a to the peripheral edge of the sheet glass 3, thereby to reduce the temperature difference between the central portion and the peripheral edge of the sheet glass for minimizing the possibility of breakage.

Figure 4:
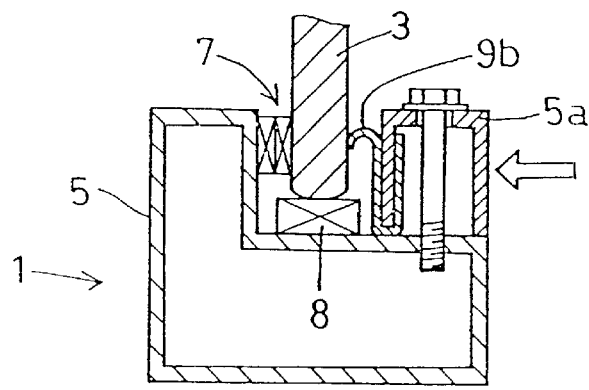
FIG. 4 is a section view showing an attaching condition of a sheet glass relating to a still further embodiment.

[3] FIG. 4 shows a still further attachment construction. In this, the sheet glass 3 is fixed in position as being bound between an elastic metal retainer member 9b engaging a press edge 5a of the sash body 5 and an incombustible plate 9c (e.g., a calcium silicate plate).

Figure 5:
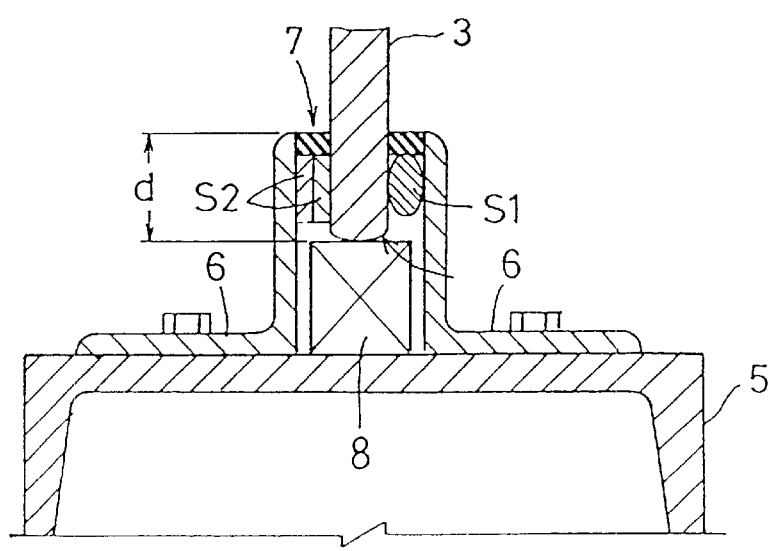
FIG. 5 is a section view showing principal portions of a fire-resistant door relating to a still further embodiment of the invention, and FIGS. 6(a) and (b) are descriptive views illustrating a method of finishing an edge of a sheet glass according to the prior art.
Figure 6:
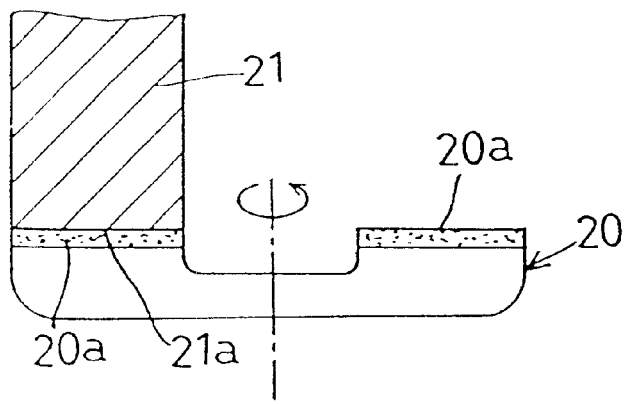
Figure 6:
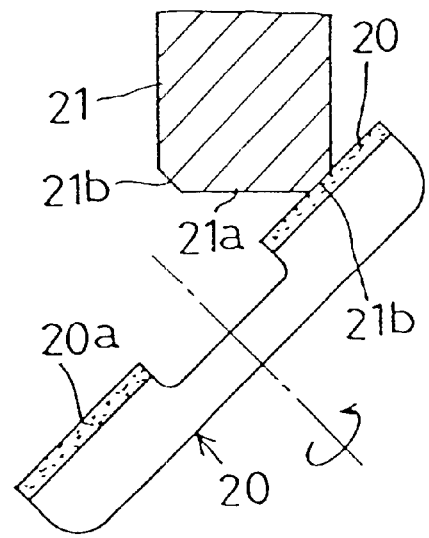

[4] Further alternatively, as illustrated in FIG. 5, without using the retainer element 9, the sheet glass 3 may be fixedly mounted by means of a ceramic rope S1 and/or a ceramic paper S2 inserted into the space 7 between the sheet glass 3 and the respective holder members 6.

With this construction, in the case of the support condition having the engaging depth d of 15 mm approximately, the finishing treatment of the sheet glass edge described above provides the edge strength above 4 $kgf/mm^2$ approximately. Thus, only the minimum of 22 $kgf/mm^2$ reinforcement may be provided by the heat tempering treatment. Further, in the case of the further support condition having the shallower engaging depth d of about 10 mm, because of the slight reduction of the temperature difference between the central portion and the peripheral edge of the sheet glass, only the minimum of 20 $kgf/mm^2$ may be provided by the heat tempering treatment.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A fire-resistant construction material comprising:

a said for holding a heat-tempered sheet glass, the sash including an annular metal sash body forming a door portion and a metal holding portion for holding the sheet glass;

wherein said metal holding portion includes a metal holder member and in incombustible place, said heat-tempered sheet glass being fixedly retained at an edge thereof within a gap formed between said metal holder member and said incombustible plate.

2. A fire-resistant construction material comprising:

a sash for holding a heat-tempered sheet glass, the sash including an annular metal sash body forming a door portion and a metal holding portion for holding the sheet glass;

wherein said metal holding portion includes a pair of ceramic members forming a space there between for fixedly retaining therein said heat-tempered sheet glass at an edge thereof.

3. A fire-resistant construction material comprising:

a sash for holding a heat-tempered sheet glass, said sash comprising an annular metal sash body forming a door portion, and a metal holding portion for holding the sheet glass;

wherein said metal holding portion includes a first metal holder member having a U-shaped cross section with two, opposed legs, said heat-tempered sheet glass being fixedly retained at an edge thereof between the legs;

wherein said metal holding portion further includes a pair of second metal holder members for pressing the respective legs of the first metal holder member form outside, the first metal holder member being accommodated in a space defined between the pair of second metal holder members; and wherein the legs of said first metal holder member has elasticity, and said first metal holder member before accommodated in said space has an outer diameter greater than a width of said space such that said heat-tempered sheet glass is retained under the pressing force from the second metal holder members and the elastic force from the first metal holder member, while the legs of said first metal holder member being placed in line contact with opposed faces of the sheet glass, respectively.

* * * * *